Oct. 27, 1970     T. H. ENGLE     3,536,361
BLENDING SCHEME FOR CURRENT RESPONSIVE RAILWAY BRAKE
Filed March 14, 1969     2 Sheets-Sheet 2

INVENTOR
THOMAS H. ENGLE

BY Dodge & Ostmann

ATTORNEYS

United States Patent Office 3,536,361
Patented Oct. 27, 1970

3,536,361
BLENDING SCHEME FOR CURRENT RESPONSIVE RAILWAY BRAKE
Thomas H. Engle, Cape Vincent, N.Y., assignor to General Signal Corporation, a corporation of New York
Filed Mar. 14, 1969, Ser. No. 807,295
Int. Cl. B60t 7/12
U.S. Cl. 303—3                                   5 Claims

ABSTRACT OF THE DISCLOSURE

Fail-safe electric current-responsive braking systems for railway cars incorporating schemes for blending the braking efforts of fluid-operated and dynamic brakes. The blending schemes utilize the dynamic brake as the primary brake and graduate the braking effort of the fluid brake as required to satisfy any deficiency between the dynamic braking effort and the total braking effort called for by the operator.

BACKGROUND AND SUMMARY OF THE INVENTION

My co-pending application, Ser. No. 761,656, filed Sept. 23, 1968, discloses a fail-safe electropneumatic braking system for railway cars wherein the fluid-operated brakes on the car are supplied with actuating pressures which are proportional to reductions in the electric current in a control wire extending through the train. This system offers several advantages not obtainable with the conventional automatic air brake, the most notable of which is a fast response.

The object of the present invention is to adapt the system just mentioned to trains employing cars equipped with dynamic brakes and to provide for proper blending of the braking efforts of the dynamic and fluid-operated brakes. According to the invention, the system uses the dynamic brake as the primary brake and energizes the fluid brake only when the dynamic brake is incapable of producing the selected braking effort and then only to the extent necessary to satisfy the deficiency. Each car in the system carries an electric current-to-pneumatic pressure transducer which responds to the sum of the currents in the resistor grid of the dynamic brake and in the control wire and produces an output pressure which increases as that sum decreases from a prescribed level. The control action of the current-responsive mechanism is balanced by a pneumatic feedback device which affords an opposing effect that decreases as the pressure applied to the fluid brake circuit increases. In one embodiment, the dynamic brake is controlled directly by control wire current, and the output of the transducer is delivered directly to the fluid brake circuit. Here, transducer output pressure always is a measure of the supplemental braking effort required of the fluid brake. In another embodiment, both brakes are controlled by the output of the transducer. In this case, the output of the transducer is conveyed directly to a dynamic brake controller, but is delivered to the fluid brake circuit through a supply and exhaust valve that responds to transducer output pressure. The supply and exhaust valve is set to maintain the fluid brake de-energized until transducer output pressure rises to the level required to produce the maximum setting of the dynamic brake. Therefore, although the mode of operation is different, the second version affords the same preference and blending as the first. And, in both cases, the invention is able to increase and decrease fluid braking effort as required during a brake application to produce exactly the total braking effort called for by the operator, regardless of irregularities in dynamic brake response attributable to speed effects or malfunction.

BRIEF DESCRIPTION OF THE DRAWINGS

Two illustrative embodiments of the invention are described herein with reference to the accompanying drawings in which.

DESCRIPTION OF THE EMBODIMENT OF FIGS. 1 AND 2

Figure 1:
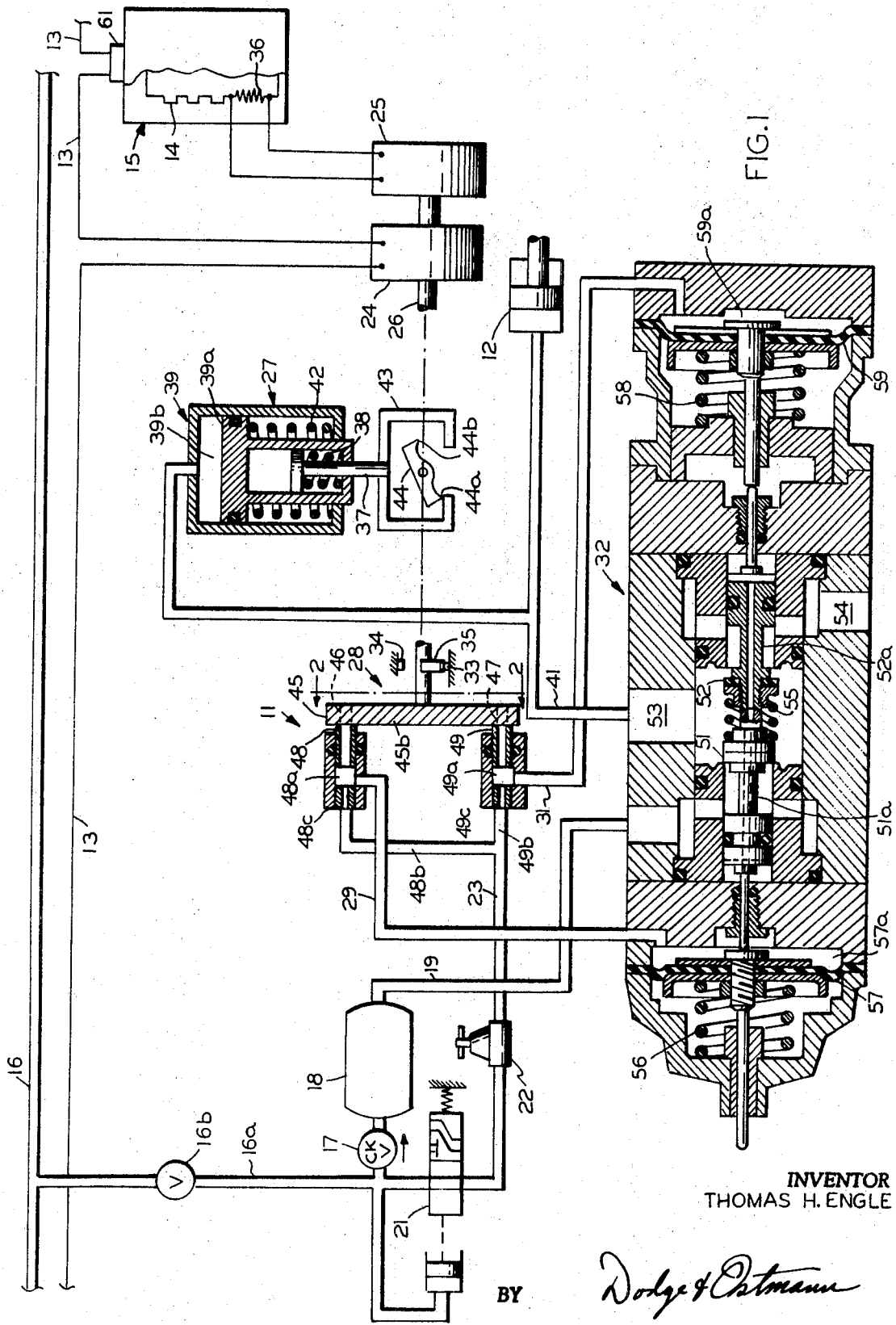
FIG. 1 is a schematic diagram showing the preferred system for a car on which the current-to-pressure transducer controls only the fluid brake.

In the embodiment depicted in FIG. 1, each car of the train carries a transducer 11 which controls the pressure supplied to the air-operated brake cylinder 12 in response to changes in the sum of the electrical currents in a control wire 13 and in the resistor grid 14 of the car's dynamic brake 15. Control wire 13 extends through the train from a source of variable DC in the head end unit and has a return path which comprises either a separate trainlined wire or the metal bodies of the head and trailing cars and the rails. The transducer 11 on each car receives compressed air through a branch 16a of a charge pipe 16 which extends through the train and is connected with an air compressor in the head end unit. Branch 16a includes a cut-off valve 16b and delivers air to the transducer along two parallel paths; one path including check valve 17 and supply reservoir 18 and serving to deliver to main supply pipe 19 the motive air required to actuate brake cylinder 12, and the other path including a shuttle valve 21 and a pressure reducer 22 and serving to deliver to pilot supply pipe 23 the low pressure air required for control purposes. Shuttle valve 21 serves selectively to connect pilot supply pipe 23 with branch pipe 16a or the atmosphere depending upon the level of the pressure in the charge pipe 16.

Each of the transducers 11 employed in the system includes five main components; namely, a pair of electrical torque motors 24 and 25 which respond, respectively, to the electrical currents in wire 13 and resistor grid 14 and which exert additive, proportional torques on a comparator shaft 26, a pneumatic torque motor 27 which applies to shaft 26 a resisting torque which decreases linearly with increases in the pressure supplied to brake cylinder 12, a pilot valve assembly 28 which is driven by shaft 26 and serves to control the pressures in a pair of pilot passages 29 and 31, and a main valve assembly 32 which responds to the piloting pressures and serves to control the supply of air from reservoir 18 to brake cylinder 12 and the exhaust of air from the brake cylinder to atmosphere. Each of the electrical torque motors 24 and 25 is of known design and comprises a permanent magnet rotor which rotates within a wound stator. The direction in which the motor rotates depends upon the direction of current flow through the stator, and the motor circuits are so correlated that both always rotate in the same direction. The torque output of each motor is directly proportional to the magnitude of the current and the sine of the magnetic angle between adjacent unlike poles of the rotor and stator. The angular motion of comparator shaft 26 is limited by a pair of stops 33 and 34 which coact with an arm 35 fixed to the shaft; therefore, the sine of the magnetic angle is substantially constant, and the torque of each electric motor will vary substantially linearly with current. In a typical case wherein the transducer employs two-pole motors, the magnetic angle of each is held between 72° and 90°, regardless of the direction of rotation. Thus, the sine always is between 0.95 and 1.00, and the deviation from true linearity is only 5%. It should be noted that while torque motor 25 responds to the current flow through resistor grid 14, it is connected across a shunt resistor 36 in series with the grid and thus actually handles only a small portion of the grid current. Preferably this shunt resistor 36 is a portion of the grid not subject to burn-out.

Pneumatic torque motor 27 comprises a drive rod 37 which is urged upward by a calibration spring 38 whose lower end is seated on a tubular extension of the piston 39a of an air motor 39. The working space 39b of motor 39 is connected with the outlet passage 41 of the transducer, so the motor responds to the pressure supplied to brake cylinder 12. Downward movement of piston 39a is opposed by a meter spring 42 which is considerably stronger than calibration spring 38 and is so chosen that, for any given output pressure within the design range of transducer 11, piston 39a will assume a definite position in its cylinder. The upward force which calbiration spring 38 exerts on rod 37 varies inversely with the deflection of meter spring 42, and consequently is a negative function of transducer output pressure. Spring 38 is so chosen that it exerts little or no force on rod 37 when output pressure is a maximum and piston 39a is in its lowest position, while, on the other hand, it applies a definite maximum force when the outlet pressure is zero and piston 39a is in its uppermost position. At its lower end, drive rod 37 carries a yoke 43 which acts upon shaft 26 through one of a pair of knife edges 44a and 44b located at opposite ends of a transverse arm 44 fixed to the shaft. The knife edges are spaced equally from the axis of shaft 26 so that, regardless of the direction of rotation, motor 27 will apply the same resisting torque.

Figure 2:
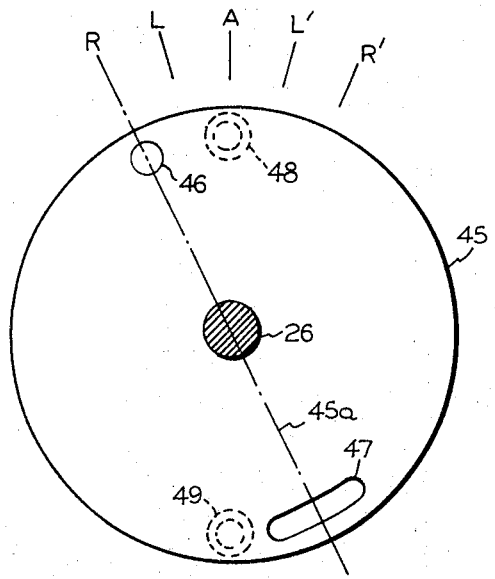
FIG. 2 is a sectional view taken on line 2—2 of FIG. 1.

Pilot valve assembly 28 comprises a flat, hardened steel disc 45 which is fixed to rotate with shaft 26 and contains two through ports 46 and 47 which are centered on the disc axis 45a (see FIG. 2). Cooperating with the disc is a pair of diametrically opposed, floating tubular valve seats 48 and 49 which bear against the ground and lapped face 45b and are arranged to register, respectively, with ports 46 and 47. The seats are held against disc 45 by the pressures in the chambers 48a and 49a at their left ends, and, since the cross sectional area of each seat which is subject to this biasing pressure is equal to the contact area of the seat and disc, the seats are essentially pressure balanced. This balancing feature minimizes the torque which motors 24 and 25 must develop to operate pilot valve assembly 28. This is vitally important because disc 45 is moved by differences between the torques of motors 24, 25 and 27. Since reductions in the frictional resistance of pilot valve 38 result in corresponding decreases in the torque difference required to operate the valve, it follows that the responsiveness of the device to changes in input will become greater as the frictional resistance of valve 38 becomes smaller. Disc 45 and seats 48 and 49 define a pair of pilot valves which are so arranged that:

(a) in the center or application position of the disc, labeled A in FIG. 2, both of the valves 45, 48 and 45, 49 are open,
(b) in either of the release positions, labeled R and R', the valves 45, 48 and 45, 49 are closed, and
(c) in either of the intermediate lap positions, labeled L and L', valve 45, 48 is closed and valve 45, 49 is open.

In the illustrated embodiment, it is assumed that disc 45 can move 18° to either side of the application position, that port 46 and the inside bore of each of the seats 48 and 49 subtend an angle of 6°, and that arcuate port 47 substends an angle of 18°. With this arrangement, application position A encompasses a 12° range of movement of disc 45, and each of the other positions R, R', L and L' encompasses a 6° range of movement. During ordinary operation, the chambers 48a and 49a of the two pilot valves are continuously supplied with air through pilot supply pipe 23, branch connections 48b and 49b, and chokes 48c and 49c. Therefore, in application position A the pilot passages 29 and 31 of the valves 45, 48 and 45, 49, respectively, are vented, in the release positions R and R' the pilot passages are pressurized to the setting of pressure reducer 22, and in the lap positions L and L' passage 29 is pressurized and passage 31 is vented.

Main valve assembly 32 includes poppet type supply and exhaust valves 51 and 52, respectively, arranged to control flow from main supply pipe 19 to an outlet chamber 53 and from the outlet chamber to an atmospheric vent port 54. The main valves are carried by balancing spools 51a and 52a which reciprocate in axially aligned bores and are arranged to that as each moves in the valve-opening direction it engages the other and causes it to move in the valve-closing direction. The opposite ends of each balancing spool have equal cross sectional areas and are interconnected by a passage extending through the spool. This renders the valves insensitive to changes in transducer outlet pressure. The supply and exhaust valves 51 and 52 are biased closed by a common compression spring 55 which is interposed between them, and each is shifted in the opening direction by a piloted motor means comprising either compression spring 56 and diaphragm motor 57 or compression spring 58 and diaphragm motor 59. It should be noted that the corresponding parts of the two motor means are reversed so that in one case the valve is opened by the spring and in the other the valve is opened by the diaphragm motor. The arrangement of the parts is such that:

(a) spring 56 opens supply valve 51 and holds exhaust valve 52 closed when motors 57 and 59 are vented,
(b) diaphragm motor 59 opens exhaust valve 52 and holds supply valve 51 closed when both diaphragm motors are pressurized, and
(c) spring 55 closes both valves when motor 57 is pressurized and motor 59 is vented.

The working spaces 57a and 59a of the motors 57 and 59 are connected, respectively, with pilot passages 29 and 31, and therefore it will be realized that the three conditions of main valve 32 just mentioned correspond, respectively, to the application, release and lap positions of pilot valve assembly 28.

Since, except for the inclusion of electric torque motor 25, the transducer 11 shown in FIG. 1 corresponds exactly to the preferred transducer of application Ser. No. 761,656, the reader is referred to that application for a complete discussion of the considerations involved in the design of that instrument.

In addition to the components already mentioned, each car in the FIG. 1 system also includes a controller 61 for dynamic brake 15 which responds directly to changes in the current in control wire 13 and provides the field of the traction motor with a current which increases as the control current decreases from a selected maximum value. This device can take many different forms, and its exact design constitutes no part of the present invention. Therefore, detailed disclosure of a particular design is deemed unnecessary. It will be understood that the complete dynamic brake also includes a propulsion controller (not shown) in the lead unit of the train which permits the operator to switch the propulsion control circuits of the traction motors between the motoring and the dynamic braking configurations.

When the FIG. 1 system is in use and the propulsion controller is set in a running position, the circuits of dynamic brake 15 will be in the motoring configuration, and consequently resistor grid 14 will be isolated from the traction motor and electric torque motor 25 will develop no torque. If the current in control wire 13 is a maximum, the torque output of motor 24 will be a maximum, and this motor will maintain comparator shaft 26 in a release position. Therefore, all of the components of transducer 11 will assume their illustrated positions, and brake cylinder 12 will be vented. Although meter spring 42 of pneumatic torque motor 27 will hold piston 39a in its uppermost position, the restoring torque exerted on comparator shaft 26 by calibration spring 38 will not be sufficient to overpower electric torque motor 24 and move disc 45 away from release position.

In order to apply the brakes, the operator shifts the propulsion controller to coast position, to thereby switch the circuits of dynamic brake 15 to the braking configuration and establish a minimum dynamic braking effort, and also reduces the current in control wire 13. This change in current reduces the torque output of electric motor 24 and also causes controller 61 to increase the field current of the traction motor. Since the traction motor acts as a generator and supplies current to resistor grid 14, electric torque motor 25 now applies to comparator shaft 26 a torque which is proportional to grid current and which urges the shaft toward release position R. The current in grid 14, and consequently the torque output of motor 25, depends upon train speed as well as the field current of the traction motor; thus, the increase in the torque output of motor 25 may be greater or less than the decrease in the torque output of motor 24. If the speed of the train is such that the dynamic brake itself can satisfy the braking command, the torque developed by motor 25 will equal or exceed the reduction in the torque output of motor 24, and comparator shaft 26 will remain in release position. In this case, the components of transducer 11 will stay in their illustrated positions, and brake cylinder 12 will remain vented. On the other hand, if the dynamic brake is incapable of supplying the braking effort called for by the operator, the torque output of motor 25 will not offset the reduction in the output of motor 24, and pneumatic torque motor 27 will rotate pilot valve disc 45 to application position A. This action opens both of the pilot valves 45, 48 and 45, 49. Since air now escapes from chambers 48a and 49a to atmosphere through the pilot valves at a rate greater than that at which it can be supplied through chokes 48c and 49c, the pressures in pilot passages 29 and 31 and working spaces 57a and 59a quickly dissipate. As a result, spring 56 opens main supply valve 51 and thereby allows air under pressure to flow from reservoir 18 to brake cylinder 12 via supply pipe 19, outlet chamber 53 and passage 41. Inasmuch as exhaust valve 52 closed as supply valve 51 opened, the pressure in passage 41, brake cylinder 12 and working space 39b now begins to rise. As the pressure in passage 41, and consequently the braking force developed by cylinder 12, increases, piston 39a of air motor 39 moves down to thereby expand calibration spring 38 and reduce the torque which it applies to comparator shaft 26. Accordingly, as the braking effort of cylinder 12 approaches the level required to compensate for the deficiency in the output of the dynamic brake, electric torque motors 24 and 25 will rotate shaft 26 in the counter-clockwise direction, as viewed in FIG. 3, and move disc 45 toward lap position L. When the sum of the outputs of the two brakes equals the selected braking effort, the torques acting on shaft 26 will be balanced, and disc 45 will come to rest in the lap position. At this time, the pressure in working space 57a rises to the setting of reducer 22, diaphragm motor 57 overpowers spring 56, and spring 55 closes main supply valve 51.

The current in resistor grid 14 varies directly with the braking effort of dynamic brake 15 and, as is known in the art, this effort commonly is a maximum at an intermediate train speed. In view of this, it should be evident that, for any given reduction in control current (i.e., any braking command), the torque output of motor 25 may either increase or decrease during the period of the brake application. If the train is operating in the high speed range when the brakes are applied, the effectiveness of dynamic brake 15 will increase during the initial period of retardation and, if an application of the fluid-operated brake was necessary originally to satisfy the braking command, transducer 11 will operate to reduce the pressure in brake cylinder 12 as train speed decreases. This effect is initiated by electric torque motor 25 which, in response to the rising current in resistor grid 14, unbalances the torques acting on shaft 26 and shifts pilot valve disc 45 to release position. When this happens, the pressure in working space 59a rises to the setting of reducer 22 and, since working space 57a is already pressurized, motor 59 opens exhaust valve 52 and closes supply valve 51. As air escapes from transducer outlet passage 41, the pressure in brake cylinder 12 and in working space 39b decreases, and the torque developed by pneumatic torque motor 27 increases. Therefore, when the braking force developed by brake cylinder 12 has decreased sufficiently to offset the increase in dynamic brake output, pneumatic torque motor 27 will have returned disc 45 to lap position. As long as the effectiveness of the dynamic brake continues to increase, transducer 11 will continuously bleed air from brake cylinder 12 in the manner just described and thereby gradually reduce the braking effort of the fluid-operated brake.

After train speed has been reduced to a low level, further retardation will be accompanied by a decrease in the current in resistor grid 14. This condition is commonly known as dynamic brake "fade." When the train enters this portion of the application cycle, the torque acting on shaft 26 will become unbalanced in the opposite sense, and pneumatic torque motor 27 will shift disc 45 to application position A. This action vents both of the working spaces 57a and 59a and allows spring 56 to open supply valve 51 and close exhaust valve 52. Now, air under pressure is delivered to outlet passage 41, so the pressure in brake cylinder 12 and in working space 39b rises. The rising pressure in space 39b effects a reduction in the torque output of pneumatic torque motor 27; therefore, when the braking effort of the fluid-operated brake has increased sufficiently to offset the decrease in the output of the dynamic brake, torque motors 24 and 25 will return disc 45 to lap position. Transducer 11 will continue to increase output pressure in this manner as long as the dynamic braking effort continues to decrease.

In view of the preceding discussion, it should be evident that, regardless of the effect of speed on dynamic braking effort, the invention always will graduate the fluid brake effort as needed to maintain correspondence between total braking effort and braking command.

The system illustrated in FIG. 1 is fail-safe from both the electrical and the pneumatic standpoints. In cases where a failure in dynamic brake 15 interrupts current flow through resistor grid 14, torque motor 25 will have no influence upon the position of comparator shaft 26, and transducer 11 will be controlled exclusively in accordance with the current in wire 13. In other words, the pressure supplied to brake cylinder 12 will vary directly in accordance with reductions in control current. If, on the other hand, current flow through the control wire 13 should be interrupted during a brake application, controller 61 will immediately assume its maximum setting and supply a maximum current to the field of the traction motor, and torque motor 27 will shift pilot valve assembly 28 to application position and thereby effect either a partial or a full application of the fluid brake. In case of pneumatic failure, for example a break in charge pipe 16, check valve 17 will be effective to prevent loss of air from reservoir 18 and, as soon as charge pipe pressure reduces to a level indicative of the malfunction, shuttle valve 21 will shift to vent position and bleed air from the piloting circuit for main valve 32. As a result of this venting action, spring 56 is enabled to open supply valve 51 and effect a full application of the fluid-operated brake. The fluid-operated brake will remain applied until charge pipe pressure is restored to the setting of shuttle valve 21. Thus, movement of the train cannot be resumed until the supply reservoirs 18 have been charged sufficiently to guarantee safe operation.

THE FIG. 3 EMBODIMENT

In contrast to the embodiment described above, the one shown in FIG. 3 is a unitary controller in which the output of transducer 11 is used to graduate both the fluid-operated brake and the dynamic brake. This version of the invention differs from its FIG. 1 counterpart in two respects. The first difference concerns the way in which dynamic brake 15 is controlled. In lieu of an electric current responsive controller 61, the FIG. 3 embodiment employs a controller 62 which is operated by an air motor 63 which responds to the pressure in the outlet passage 41 of the transducer and is opposed by a compression spring 64. The second distinguishing feature of the FIG. 3 embodiment is a self-lapping supply and exhaust valve 65 which is interposed between transducer output passage 41 and the fluid brake circuit consisting of cylinder 12 and the air motor 39 of pneumatic torque motor 27, and which serves to delay build-up of pressure in this circuit until dynamic brake controller 62 has reached the maximum limit of its controlling range. As illustrated, valve 65 includes an inlet passage 41a leading to transducer outlet passage 41, an outlet passage 41b leading to brake cylinder 12 and air motor 39, an atmospheric vent port 66, and a reciprocable spool 67. A compression spring 68 biases spool 67 to the exhaust position in which outlet connection 41b communicates with port 66, and motor 63, acting through a collar 63a fixed to its piston rod 63b, serves to shift the spool to the supply position. In this position, peripheral spool groove 67a interconnects the inlet and outlet passages 41a and 41b. Intermediate these two positions is a lap position in which spool land 67b isolates passage 41b from both inlet passage 41a and vent port 66.

Figure 3:
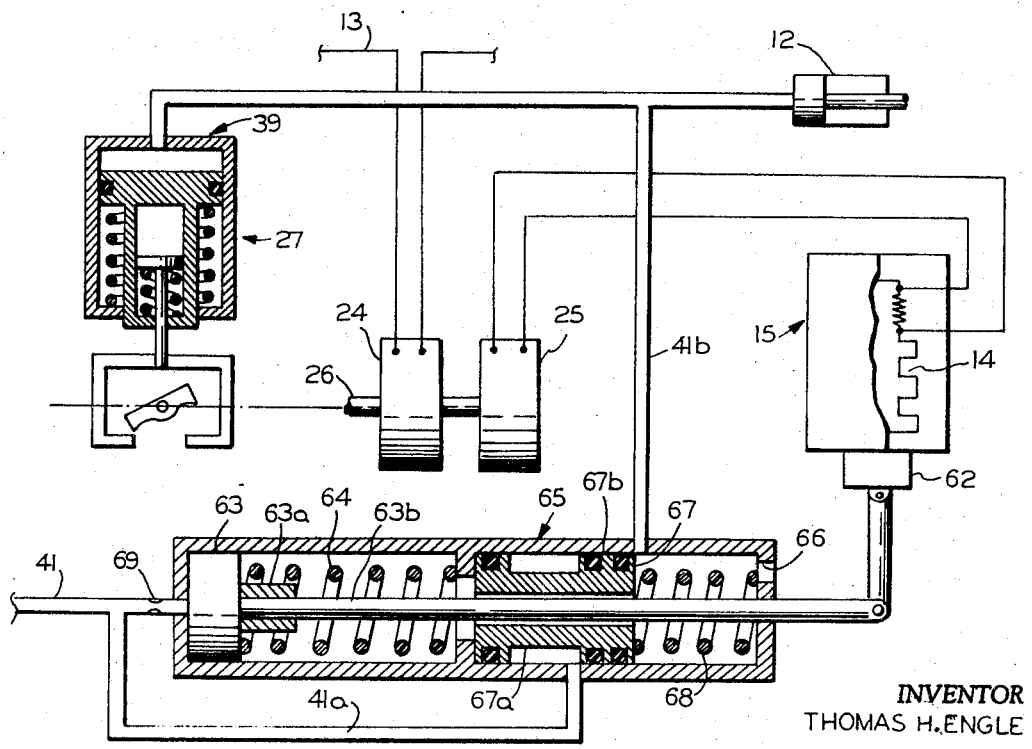
FIG. 3 is a partial schematic diagram illustrating one way in which the FIG. 1 system can be modified to enable the transducer to control both brakes.

When the FIG. 3 system is in service and the brakes are released, torque motor 24 will apply a maximum torque to comparator shaft 26 which will hold pilot valve assembly 28 in release position. This causes main valve assembly 32 to vent outlet passage 41 and permit springs 64 and 68 to hold motor 63 and valve spool 67, respectively, in their illustrated positions. As a result, brake cylinder 12 and motor 39 will be vented to atmosphere through port 66. At this time, the propulsion controller will be in a running position, and the circuits of dynamic brake 15 will be in the motoring configuration; consequently, there will be no current flow through resistor grid 14, and the output of torque motor 25 will be zero.

When the propulsion controller is shifted to coast position and the current in control wire 13 is reduced to effect a brake application, the torque output of motor 24 decreases and pneumatic torque motor 27 immediately shifts disc 45 of pilot valve assembly 28 to application position. As in the case of FIG. 1 embodiment, this action effects opening of main supply valve 51 and allows air under pressure to flow from supply reservoir 18 to outlet passage 41. When the output pressure of transducer 11 rises above a fixed low level, air motor 63 actuates the dynamic brake controller 62, thereby causing the latter to commence to increase the current supplied to the field of the traction motor. Now, current begins to flow through resistor grid 14, and consequently motor 25 commences to exert on shaft 26 a torque which supplements that developed by motor 24. When the braking effort of the dynamic brake corresponds to the braking command (i.e., the reduction in control current), motors 24 and 25 will shift pilot valve disc 45 to a lap position and cause main supply valve 51 to close. If there is a further reduction in control current, or a decrease in dynamic brake effectiveness resulting from a change in train speed, pneumatic torque motor 27 will move pilot valve disc 45 back to application position and effect a further increase in transducer output pressure. This, of course, will cause air motor 63 to change the setting of controller 62 and increase the field current of the traction motor. On the other hand, if control current is increased, or the change in train speed increases the effectiveness of the dynamic brake, motors 24 and 25 will shift disc 45 to a release position and effect a reduction in transducer output pressure. In this case, spring 64 will alter the setting of controller 62 in the opposite sense and thereby effect an appropriate decrease in field current. Thus, as long as the braking action called for by the operator is within the capability of dynamic brake 15, the system will graduate the dynamic braking effort as required to match the braking command and will keep brake cylinder 12 and pneumatic motor 39 vented.

If dynamic brake 15 is incapable of satisfying the braking command when controller 62 is at its maximum setting, torque motors 24 and 25 will not be able to shift pilot valve 28 to lap position against the opposition of pneumatic motor 27. Consequently, transducer output pressure will approach the maximum, and air motor 63 will cause collar 63a to shift valve spool 67 to its supply position. Now, air under pressure can flow into the fluid brake circuit and raise the pressure in brake cylinder 12 and in air motor 39. As the braking effort of the fluid-operated brake increases, the restoring torque exerted on shaft 26 by motor 27 decreases; therefore, when the supplemental braking action afforded by the fluid brake approaches the level required to offset the deficiency in dynamic brake 15, electric torque motors 22 and 25 will commence to move pilot valve disc 45 toward lap position. A torque balance will be achieved when the parts are in lap position and the sum of the outputs of the two brakes corresponds to the braking command. When pilot valve 28 laps, it effects closure of main supply valve 51 and precludes further air flow into outlet passage 41. At this instant, valve 65 is still in the supply position, so air can continue to flow from passage 41 to passage 41b. However, since main supply valve 51 is closed, this flow reduces the pressure in passage 41 and allows springs 64 and 68 to move air motor 63 and valve 65 to the left to position the latter in lap position. In other words, the mechanism will trap in the fluid brake the pressure needed to develop the required supplemental braking effort and will trap in passage 41 the higher pressure needed to keep controller 62 at its maximum setting.

If the dynamic braking effort fades or there is a further reduction in control current, pneumatic torque motor 27 will return pilot valve disc 45 to application position, main supply valve 51 will open, and air will again be admitted into outlet passage 41. As a result, motor 63 will again shift supply and exhaust valve 65 to supply position and thereby permit a further increase in the pressure in brake cylinder 12 and in pneumatic motor 39. As before, all valves (i.e., pilot valve 28, main valve 32, and supply and exhaust valve 65) will return to lap position when the fluid braking effort has increased sufficiently to offset the difference between dynamic brake output and braking command. On the other hand, if control current or dynamic braking effectiveness increases, torque motors 24 and 25 will shift pilot valve disc 45 to release position and thereby cause main exhaust valve 52 to open and bleed air from outlet passage 41. Valve 65 now shifts to exhaust position and commences to bleed air from the fluid brake circuit. This reduces the braking effort of cylinder 12 and also increases the torque output of pneumatic torque motor 27. Therefore, when the required reduction in fluid brake effort has been achieved, electric motors 24 and 25 will move pilot valve 28 to lap position and cause main exhaust valve 52 to close. However, supply and exhaust valve 65 will remain in exhaust position because the pressure in passage 41 will now be lower than that required for motor 63 to hold the valve in lap position. Because of this, the pressure in the fluid brake circuit will decrease slightly below the desired level, and the output of torque motor 27 will increase sufficiently to enable it to shift pilot valve 28 to application position. This action reopens main supply valve 51 and allows air under pressure to flow into outlet passage 41 and, through valve 65, into the fluid brake circuit. As a result, fluid braking effort is restored to the required level. At that time, all of the valves will move to lap position in the same manner as during an initial fluid brake application.

If the braking command is reduced to a level within the capability of the dynamic brake while both brakes are applied, transducer output pressure will decrease and valve 65 will shift to exhaust position as before, but here transducer 11 will not re-balance (i.e., assume a lap condition) until its output pressure has reduced sufficiently to allow spring 64 to move dynamic brake controller 62 to a reduced setting. In the course of this operation, valve 65 moves to and stays in exhaust position, so the pressure in the fluid brake circuit is completely dissipated and the torque output of motor 27 is raised to the maximum. As the setting of controller 62 is reduced, so too is the current in grid resistor 14 and the torque output of electric torque motor 25. Thus, when the effort of dynamic brake 15 is reduced to the level of the new command signal, pneumatic torque motor 27 will be able to move the pilot valve 28 to lap position and effect closure of main exhaust valve 52. When the control current in wire 13 is ultimately restored to the maximum value and the propulsion controller is shifted to a running position, the valves 28 and 32 of transducer 11 will assume their exhaust positions, and the circuits of dynamic brake 15 will revert to the motoring configuration.

As in the case of the FIG. 1 embodiment, the FIG. 3 system is fail-safe electrically as well as pneumatically. In case of a break in control wire 13 or charge pipe 16, the system will effect a full application of either the pneumatic brake or both brakes depending upon whether the brakes are released or applied when the break occurs. In the event of a malfunction in dynamic brake 15, the system will apply the fluid-operated brake as required to satisfy the braking command.

It should be noted that the transducer 11 in FIG. 3 sometimes supplies air exclusively to air motor 63 and at other times supplies air to the fluid brake circuit. In cases where the volumes of these loads are comparable, for example when the fluid brake is controlled by a relay valve which is operated by transducer output pressure, the response of the system will be essentially the same regardless of whether one or both brakes are being used. On the other hand, if, as in the illustrated embodiment, the air delivered to the brake circuit is employed directly in the brake cylinder, the two load volumes can be quite different, and consequently there may be a marked difference between the rates at which the two braking efforts change with control current. This effect can be eliminated or at least minimized easily by including a choke 69 in the connection between air motor 63 and output passage 41. The size of the choke is selected to take into account the difference between the load volumes so that the rates at which the pressure change in motor 63 and in brake cylinder 12 will be substantially equal.

It also should be noted that, while the illustrated systems employ the preferred transducer of application Ser. No. 761,656, any of the other versions of the versions of the transducer disclosed in that application may be used. Moreover, it should be obvious that an air-to-hydraulic pressure translator and a hydraulic brake cylinder may be substituted for the conventional air-operated brake cylinder 12. A suitable translator for these installations in the one described in co-pending application Ser. No. 746,684, filed July 22, 1968.

What is claimed is:
1. A braking system for a railway car comprising:
 (a) a fluid brake circuit including at least one brake cylinder (12), and a dynamic brake (15) including a resistor grid (14);
 (b) an electrical control wire (13) extending through the car from end to end; and
 (c) brake control means (11, 16, 18, 61 or 11, 16, 18, 62, 65), including an electric current-to-pneumatic pressure transducer (11) which responds to the electric currents in the control wire (13) and the grid (14) and to the pressure in the fluid brake circuit, for increasing the braking effort of the dynamic brake (15) as the current in the control wire decreases from a predetermined value, and for establishing in the fluid brake circuit a pressure which increases as the sum of said currents decreases from a selected level.
2. A braking system as defined in claim 1 in which:
 (a) the brake control means includes a controller (61) for the dynamic brake (15) which responds directly to the current in the control wire (13); and
 (b) the transducer (11) has an output passage (41) which is in constant communication with the fluid brake circuit and serves exclusively to regulate the pressure established in that circuit.
3. A braking system as defined in claim 1 in which the brake control means:
 (a) has an output passage (41) in which it establishes a pressure which increases as the current in the control wire decreases below said predetermined value;
 (b) includes a controller (62) for the dynamic brake (15) which responds to the pressure in the outlet passage (41); and
 (c) includes a self-lapping supply and exhaust valve (65) which responds to the pressure in the outlet passage (41) and has supply and exhaust positions in which, respectively, it connects the fluid brake circuit with the output passage (41) and the atmosphere, and a lap position in which it isolates the fluid brake circuit from bothe the passage (41) and the atmosphere.
4. A braking system as defined in claim 3 in which:
 (a) the controller (62) is operated by means including an air motor (63) which is connected with the output passage (41); and
 (b) the supply and exhaust valve (65) is biased to the exhaust position and is shifted to the supply position by said air motor (63) after the latter has caused the controller (62) to raise the braking effort of the dynamic brake (15) to a maximum.
5. A braking system as defined in claim 3 in which:
 (a) the volume of the fluid brake circuit is materially greater than the volume of the air motor (63); and
 (b) the air motor (63) is connected with the output passage (41) through a choke (69).

References Cited

UNITED STATES PATENTS

| | | | |
|---|---|---|---|
| 2,933,350 | 4/1960 | Hines | 303—3 |
| 3,275,380 | 9/1966 | May | 303—3 |

DUANE A. REGER, Primary Examiner

U.S. Cl. X.R.

303—16